Aug. 20, 1935.　　　　S. J. BURRESS　　　　2,012,218
AUTOMOBILE WINDSHIELD SPRAYING DEVICE
Filed July 2, 1934　　　2 Sheets-Sheet 1

Spurlin J. Burress, INVENTOR
BY Victor J. Evans & Co.
ATTORNEY

Aug. 20, 1935.  S. J. BURRESS  2,012,218
AUTOMOBILE WINDSHIELD SPRAYING DEVICE
Filed July 2, 1934   2 Sheets-Sheet 2
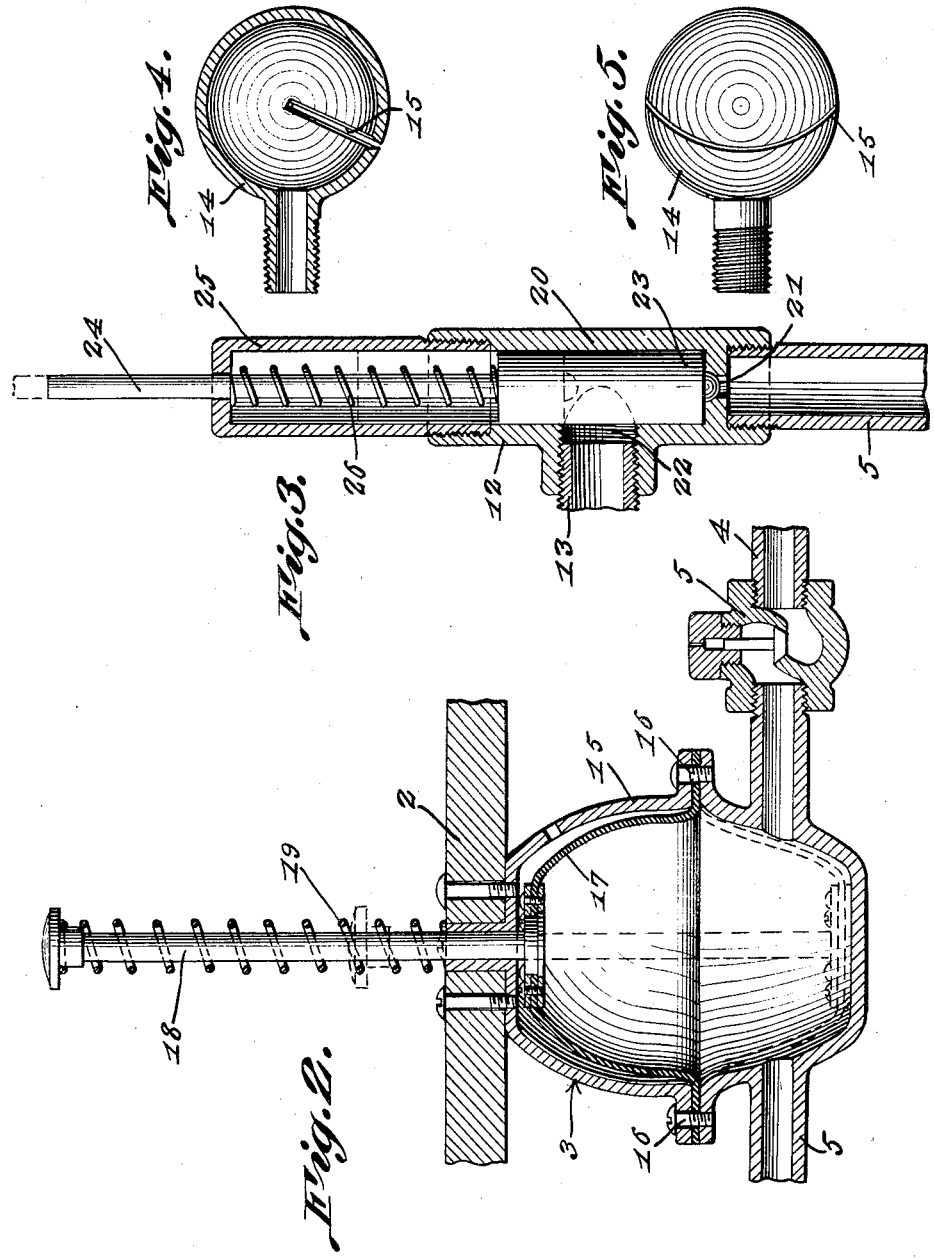
Spurlin J. Burress, INVENTOR
BY Victor J. Evans & Co.
ATTORNEY Patented Aug. 20, 1935

2,012,218

UNITED STATES PATENT OFFICE 2,012,218

AUTOMOBILE WINDSHIELD SPRAYING DEVICE

Spurlin J. Burress, Marion, Ill.

Application July 2, 1934, Serial No. 733,511

1 Claim. (Cl. 20—40.5)

This invention relates to a windshield spraying device and has for the primary object the provision of a device of the above stated character whereby at any desired time a fluid under pressure may be directed onto the glass of a windshield within the radius of the area acted upon by a windshield wiper to remove dirt, snow, ice and other foreign matter therefrom so that clear vision may be had under all kinds of weather and driving conditions.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view illustrating a motor vehicle with a spraying device applied thereto and constructed in accordance with my invention.

Figure 2 is a vertical sectional view illustrating a pump.

Figure 3 is a fragmentary vertical sectional view illustrating a regulating valve for the discharge of fluid from the device.

Figure 4 is a vertical sectional view illustrating the discharge nozzle.

Figure 5 is a plan view illustrating the same.

Figure 1:
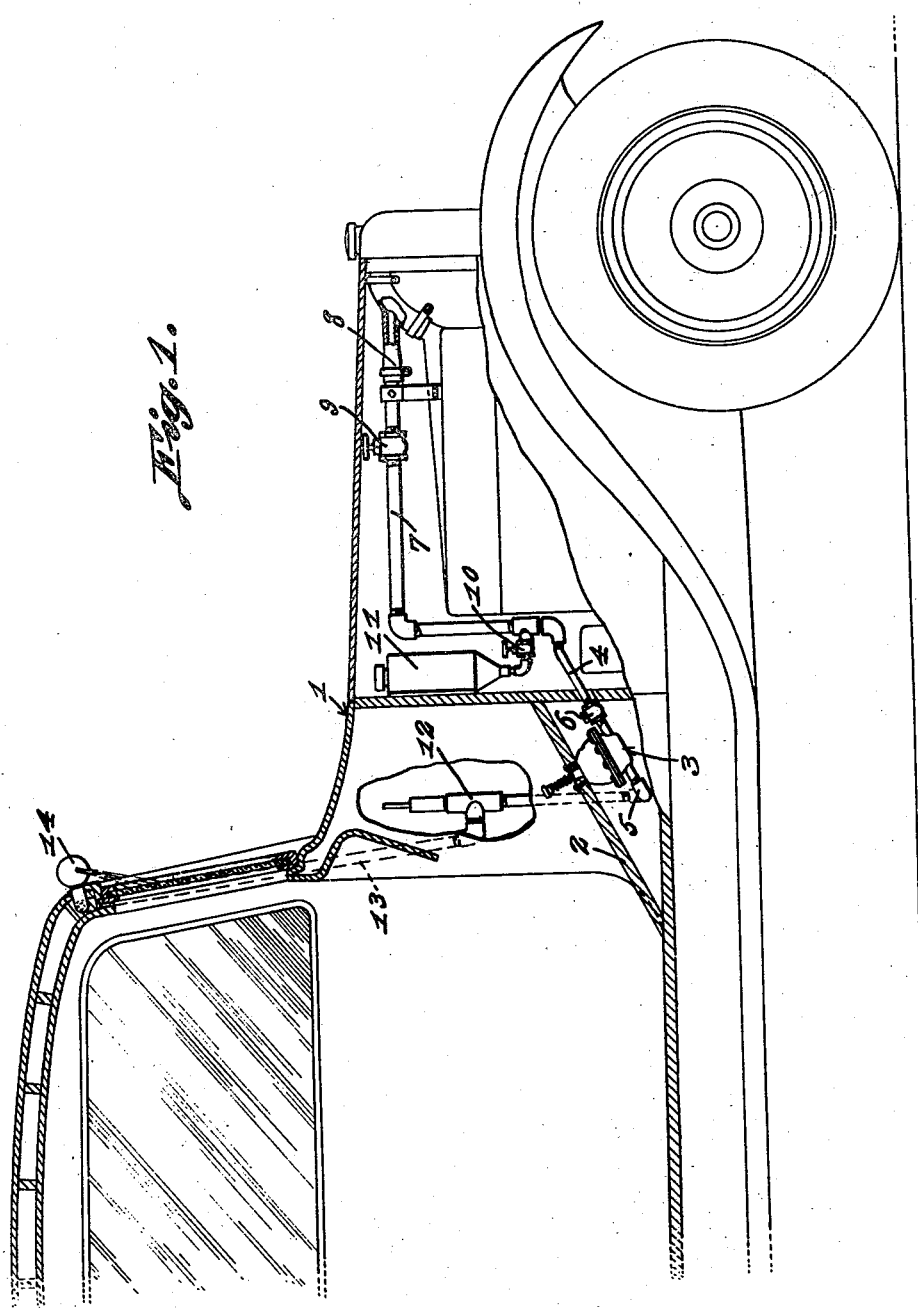

Referring in detail to the drawings, the numeral I indicates a conventional type of motor vehicle equipped with a spraying device forming the subject matter of the present invention and disclosing the discharge of liquid onto the glass of the windshield within an area acted upon by the usual windshield wiper (not shown).

Mounted to the floorboard 2 of the motor vehicle is a pump 3 having connected thereto an intake pipe 4 and an outlet pipe 5. A check valve 6 is located in the intake pipe 4 and the latter is connected to a pipe 7 extending into the engine compartment of the motor vehicle and is connected to the radiator of the motor vehicle, as shown at 8. A cut-off valve 9 is located in the pipe 7 and between the cut-off valve and the intake pipe 4 of the pump is a control valve 10 to which a reservoir 11 is connected. The reservoir is suitably mounted to the vehicle and is adapted to contain an anti-freezing liquid. The construction described will permit the pump to obtain either liquid from the radiator or an anti-freeze liquid through the reservoir through the manipulation of the valves 9 and 10. The check valve 6 acts to prevent the liquid from returning from the pump to the pipe 7 during the operation of said pump. The outlet pipe 5 is connected to a regulating valve 12 and the outlet of the latter is connected to a pipe 13 extending upwardly through the body of the motor vehicle to a point above the windshield and has detachably connected thereto a nozzle 14. The nozzle is preferably of spherical shape having a discharge slot 15 suitably curved for the purpose of directing liquid onto the glass of a windshield within an area acted upon by the windshield wiper. During the operation of the pump, the liquid obtained either from the reservoir 11 or the radiator of the motor vehicle is forced through the pipe 13 in a desired amount by the regulating valve 12 and discharges by way of the nozzle over the glass of the windshield so that through the co-operation of the windshield wiper dirt, snow, ice and other foreign matter will be readily removed from the glass so that the driver of the motor vehicle may have clear vision. The water of the radiator is discharged over the glass of the windshield in non-freezing weather while in freezing weather the anti-free liquid in the reservoir 11 is discharge onto the glass of the windshield.

The pump 3 is so located on the motor vehicle that the driver may at any time actuate the pump for the purpose of discharging the liquid onto the windshield and consists of a sectional casing 15 wherein the sections are detachably connected at 16 and one section is bolted or otherwise secured to the vehicle body. The casing forms a pump cylinder and operating within the casing is a piston 17 to which a plunger 18 is connected and the latter extends through the floorboard of the motor vehicle and has mounted thereon a coiled spring 19 acting to urge the piston 17 in one direction whereby pressure on the plunger by the operator's foot will urge the piston 17 in an opposite direction. The piston 17 is in the form of a cup-shaped diaphragm, the periphery of which is anchored between the sections of the casing and the diaphragm is removably secured to the plunger 18. The reciprocation of the plunger 18 will cause the diaphragm to draw fluid into the casing and discharge the fluid by way of the outlet pipe under pressure and the amount of fluid discharged from the nozzle is governed by the control valve 12 which consists of a casing 20 having a check valve 21 in its inlet. The outlet is indicated by the character 22 and operating in the casing is a piston 23, the stem of which is indicated by the character 24 and extends through a removable cap 25 carried by the casing 20. Interposed between the cap 25 and the piston is a coil spring 26 acting to urge the piston 23 to close the outlet 22. The tension of the spring 26 may be varied by adjusting the cap 25 on the casing 20. In order for the liquid from the pump to pass to the nozzle it must act upon the piston 23 to move the latter to open the outlet 22 against the action of the spring 26 and as the tension of the spring 26 can be varied the valve 12 may be regulated to control the amount of liquid discharged by the nozzle.

Having described the invention, I claim:

A windshield spraying device comprising a pump mounted to a motor vehicle and including an operating medium located in convenient reach of the operator of the motor vehicle, means connecting the pump to the cooling system of the automobile to obtain heated water therefrom, a control valve in said means, a reservoir adapted to contain anti-freeze liquid connected to said first means, a control valve for regulating the anti-freeze liquid to said first means, a check valve in said first means, an outlet pipe connected to the pump and terminating at the windshield of the motor vehicle, a nozzle detachably secured to said pipe and including a spherical-shaped portion having a curved slot for directing the liquid onto the glass of the windshield, and an automatic regulating valve connected into said pipe for governing the discharge of liquid from the nozzle by said pump.

SPURLIN J. BURRESS.